May 13, 1952  W. HAMPTON ET AL  2,596,147
TELEMETERING SYSTEM
Filed March 23, 1950  5 Sheets-Sheet 1

INVENTORS.
WILLIAM HAMPTON
GEORGE W. NEUHARD
BY
ATTORNEY
AGENT

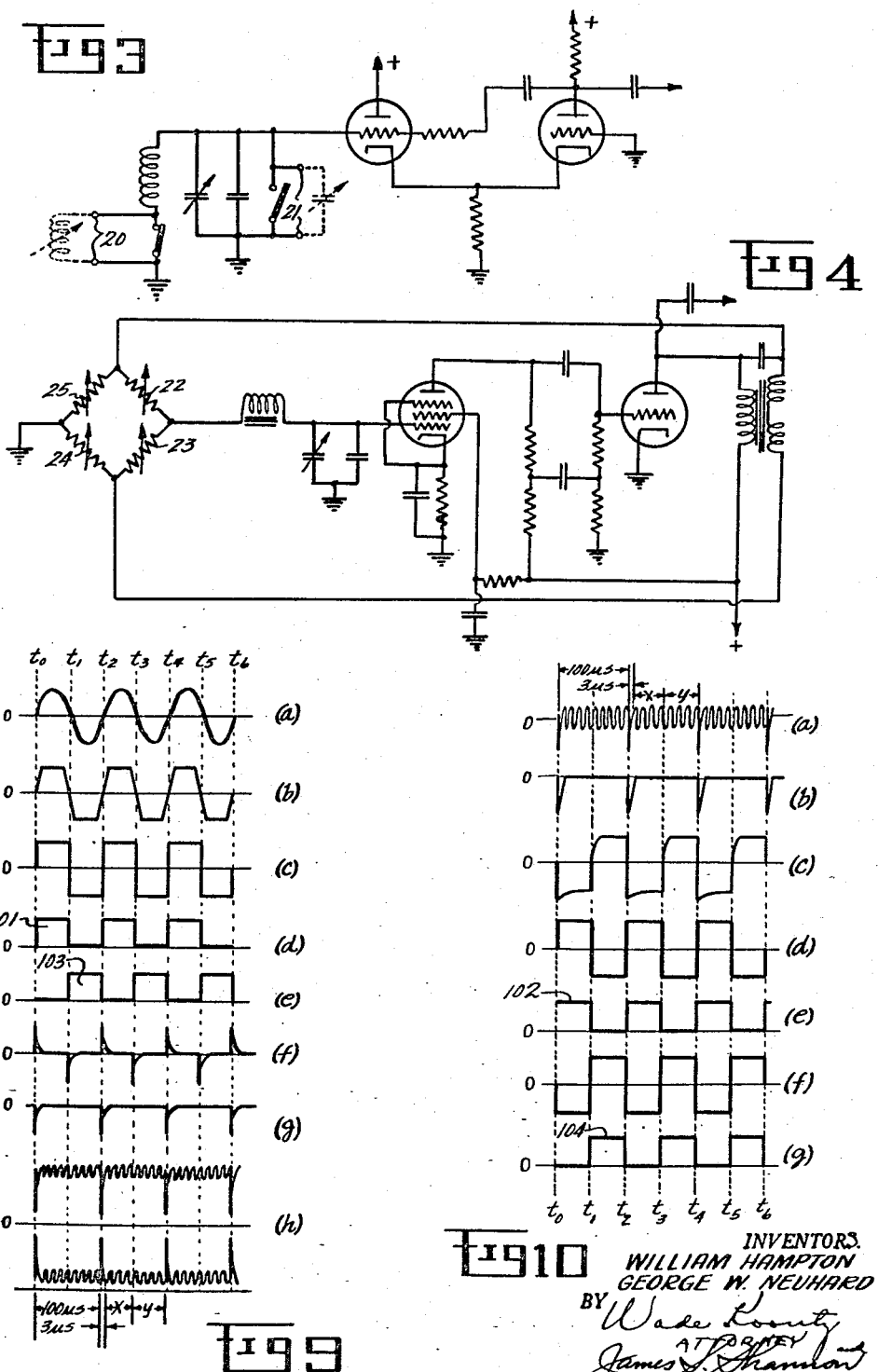

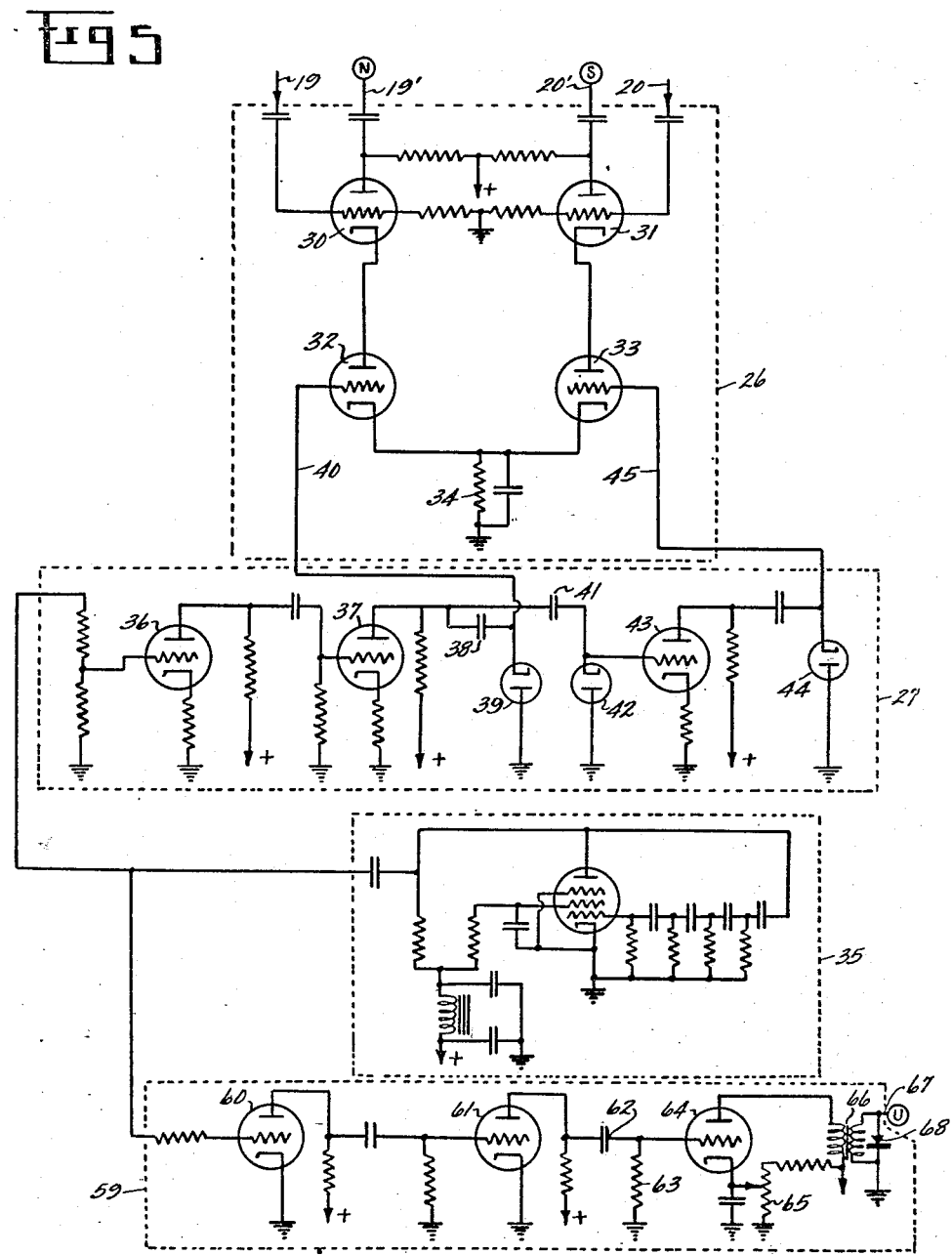

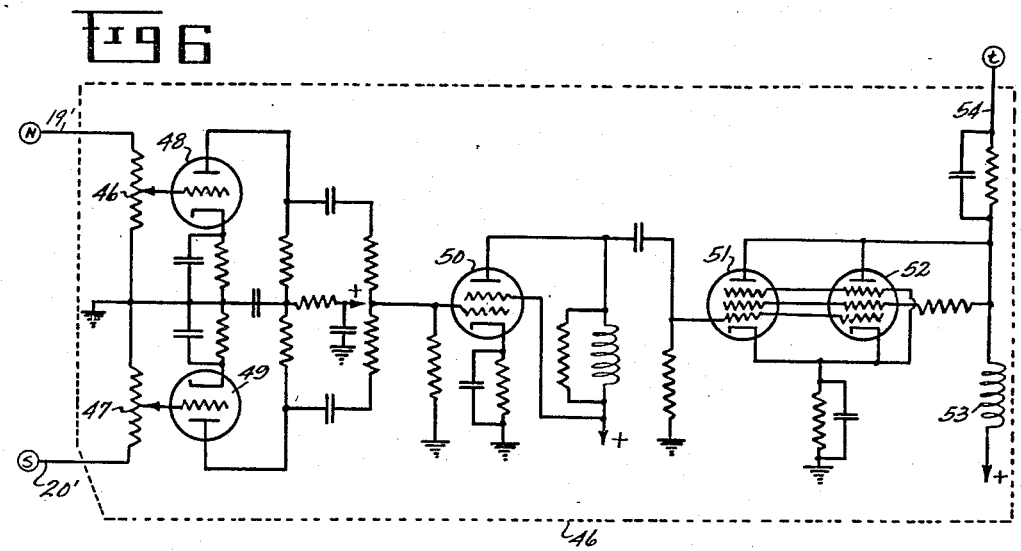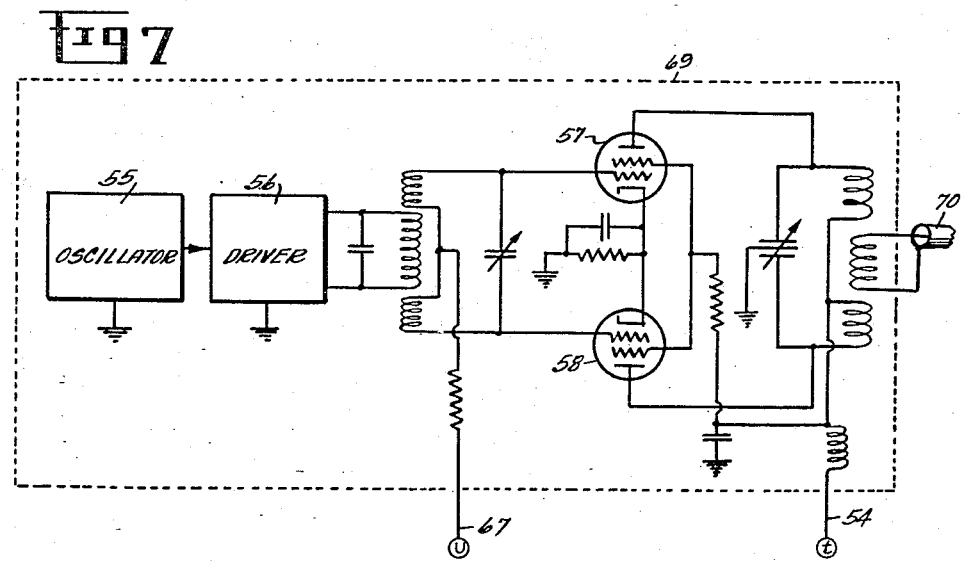

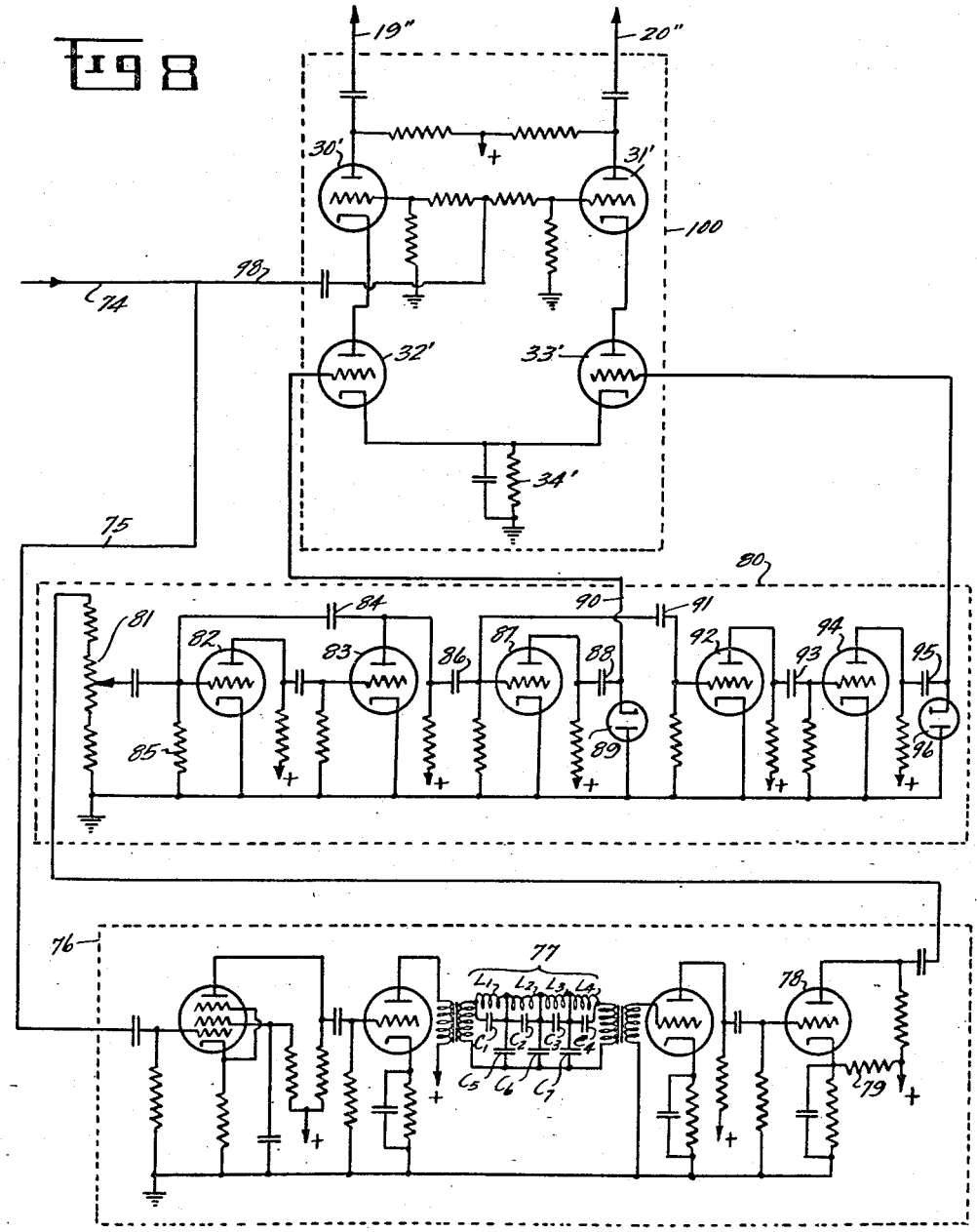

Patented May 13, 1952

2,596,147

UNITED STATES PATENT OFFICE 2,596,147

TELEMETERING SYSTEM

William Hampton and George W. Neuhard,
Dayton, Ohio

Application March 23, 1950, Serial No. 151,508

2 Claims. (Cl. 177—351)

(Granted under the act of March 3, 1883, as
amended April 30, 1928; 370 O. G. 757)

The invention described herein may be manufactured and used by or for the United States Government for governmental purposes without payment to me of any royalty thereon.

This invention relates to telemetering systems and particularly to such systems for transmitting a large number of independent data signals to a remote point over a single channel transmission medium such, for example, as a radio linkage.

One known method of accomplishing the above result consists in providing a plurality of subcarrier frequencies at the transmitting end each of which is modulated by one of the data signals. The modulated subcarrier frequencies in turn modulate a final carrier frequency which, together with the resulting side bands, is transmitted over the single channel linkage. Although this arrangement provides continuous transmission of each data signal, if a large number of data signals are to be transmitted and if sufficient frequency spacing of the subcarrier frequencies is provided to permit ease of separation at the receiving end by filtering, the band width required becomes excessive.

Another known method of transmitting a plurality of data signals over a single channel linkage consists in modulating a single carrier frequency by each of the data signals in succession for short intervals of time. In this system the band width of the transmitting signal is quite narrow, however, if a large number of data signals are transmitted the sampling rate becomes so low that rapid variations of the data signal are not followed and the signal is therefore not accurately represented at the receiving end.

It is the object of the invention to provide a telemetering system which is capable of accurately transmitting a large number of data signals without requiring a transmission medium of undue band width. Briefly this is accomplished by providing at the transmitting end a plurality of groups of subcarrier frequencies, each modulated by one of the data signals. By means of a suitable switching device these groups of frequencies are caused to modulate the final carrier frequency in succession for short intervals of time. By using the same subcarrier frequencies in each group the band width requirements of the transmitted wave are considerably reduced, while the simultaneous transmission of a number of data signals in each subcarrier group permits a sufficiently high sampling rate for faithful reproduction of the data signal. At the receiving end a switching device, operated in synchronism with the transmitter switcher, channels the subcarrier groups into the proper circuits where the subcarrier frequencies are separated by filters and demodulated to produce the original data signals.

A specific embodiment of a telemetering system employing the invention will be described in connection with the accompanying drawings, in which:

Figs. 3 and 4 are examples of suitable data oscillators for use in the telemetering system;

Fig. 5 is a diagram of the transmitter switching amplifier and synchronizing pulse generator;

Fig. 6 is a diagram of the transmitter modulator;

Fig. 7 is a diagram of the transmitter;

Fig. 8 is a diagram of the receiving switching amplifier and synchronizing pulse separator;

Fig. 9 shows various wave forms in the transmitter; and

Fig. 10 shows various wave forms in the receiving circuits.

Figure 1:
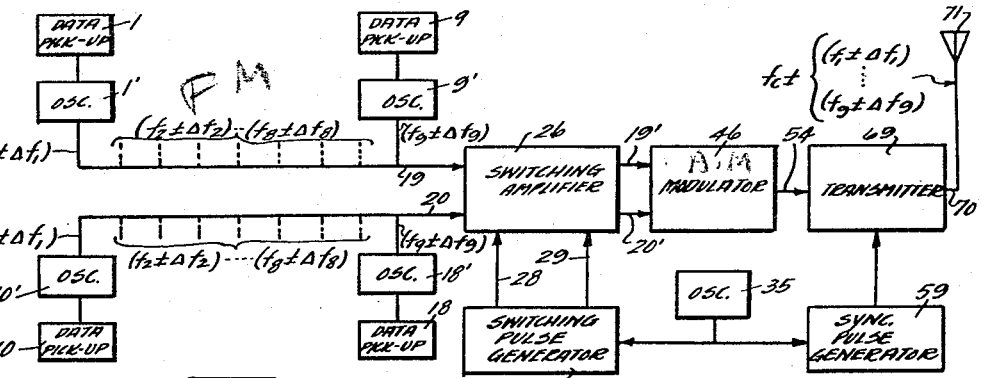
Fig. 1 is a block diagram of the transmitting end of the telemetering system.
Figure 2:
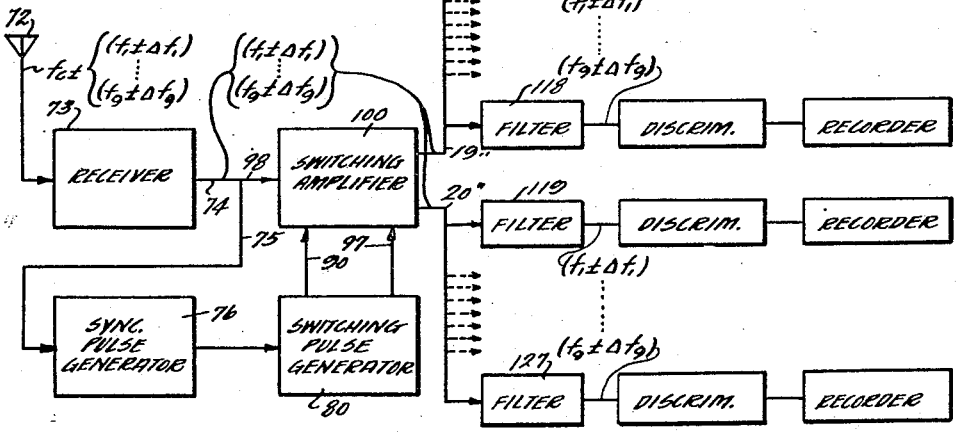
Fig. 2 is a block diagram of the receiving end of the telemetering system.

Referring to Figs. 1 and 2, the telemetering system shown is designed to transmit eighteen data signals in two groups of nine signals each over a single channel radio linkage. At the transmitting end of the system, shown in Fig. 1, the data signals are derived from eighteen data pickups, only units 1, 9, 10 and 18 of which are shown. Each data pickup is associated with a data oscillator. Therefore, there are also eighteen data oscillators, only units 1', 9' and 10' and 18' of which are shown. Oscillators 1' through 9' are connected to a common circuit 19 and have mean frequencies $f_1$ through $f_9$, respectively, whereas oscillators 10' through 18' are connected to another common circuit 20 but have the same mean frequencies $f_1$ through $f_9$, respectively. The data signal produced by the data pickup may be in the form of a voltage, resistance, inductance or capacity that varies in accordance with the data to be transmitted. The oscillator associated with the data pickup utilizes the data signal to produce a shift in its frequency away from the mean value in either direction by an amount proportional to the instantaneous amplitude of the data signal. The output signals of the several data oscillators are therefore frequency modulated waves and are designated in the drawings $(f_1 \pm \Delta f_1)$, $(f_2 \pm \Delta f_2)$, etc. Representative values for these frequencies are:

$f_1 = 106$ kc.
$f_2 = 116$ kc.
$f_3 = 126$ kc.
$f_4 = 137.5$ kc.
$f_5 = 150$ kc.
$f_6 = 163.5$ kc.
$f_7 = 178$ kc.
$f_8 = 195$ kc.
$f_9 = 206$ kc.
$\Delta f = 2$ kc (max.)

The design of the data oscillator depends upon the character of the data signal. Fig. 3 shows an oscillator that may be used when the data signal is in the form of a variable inductance or a variable capacity, the signal in the former case being applied to terminals 20 and in the latter case to terminals 21. A data oscillator suitable for use with a data signal in the form of a variable resistance is shown in Fig. 4. Resistors 22, 23, 24 and 25 are connected in a bridge circuit and vary in accordance with the data to be transmitted, adjacent resistors varying in opposite directions.

The switching amplifier 26, Fig. 1, provides for the opening and closing of circuit connections between circuits 19 and 19' and between circuits 20 and 20' in accordance with switching pulses generated by switching pulse generator 27. The arrangement is such that circuit 19 is connected to circuit 19' and circuit 20 is disconnected from circuit 20' for a short interval of time, following which circuit 20 is connected to circuit 20' and circuit 19 disconnected from circuit 19' for an equal interval of time.

The circuit details of switching amplifier stage 26 are shown in Fig. 5. Circuits 19 and 19' are coupled to the input and output circuits, respectively, of a resistance coupled amplifier stage comprising tube 30. A similar amplifier stage comprising tube 31 has circuits 20 and 20' coupled to the input and output circuits, respectively, thereof. The anode-cathode path of tube 32 is connected in series with the cathode of tube 30 and, similarly, the anode-cathode path of tube 33 is connected in series with the cathode of tube 31. The cathode of tubes 32 and 33 are connected together and to ground through bias resistor 34, so that the space currents of tubes 30 and 31 must pass through tubes 32 and 33, respectively. In a manner to be explained later, positive switching pulses are applied alternately to the grids of tubes 32 and 33. In the absence of a positive pulse on either grid, that grid is at ground potential or only slightly thereabove depending upon the voltage drop across diode 42 or 44. Assuming a positive pulse on the grid of tube 33, this tube becomes conductive thereby completing the cathode circuit of tube 31 to ground through resistor 34 and thereby rendering the latter tube operative as an amplifier for the transference of signal from circuit 20 to circuit 20'. During this time, however, the grid of tube 32 is at or near ground potential so that the negative bias developed across resistor 34 by the space current of tube 31 biases tube 32 beyond the cutoff point. This opens the circuit between the cathode of tube 30 and ground, thus rendering this tube inoperative and isolating circuit 19' from circuit 19. In a similar manner, a positive pulse on the grid of tube 32 renders tube 30 operative and tube 31 inoperative, thus coupling circuit 19 to circuit 19' and isolating circuit 20' from circuit 20.

The positive switching pulses are produced by the action of switching pulse generator 27 on the output wave of oscillator 35. The circuit details of both of these elements are shown in Fig. 5. The output of oscillator 35, which is substantially a sine wave as shown in Fig. 9 (a), is applied to the grid of tube 36 in switching pulse generator 27. The tube 36 is a clipper of the overdrive type and acts to limit both the positive and negative half-cycles of the applied wave so that the voltage wave applied to the grid of tube 37 is as shown in Fig. 9 (b). Tube 37 is an over-driven clipper of the same type as tube 36 and through its amplifying and clipping action further squares up the output of tube 36 so that the voltage applied through condenser 38 to the clamping diode 39 is substantially a square wave as shown in Fig. 9 (c). Since the clamping diode 39 conducts on the negative half-cycles of wave (c) but is non-conductive on the positive half-cycle there is applied to the grid of tube 32 over conductor 40 a series of pulses positive relative to ground or zero potential as shown in Fig. 9 (d). During the negative half-cycle of wave (c) the grid of tube 32 is substantially at ground potential due to the low potential drop across tube 39 when in a conductive condition.

A square wave such as shown at Fig. 9 (c) is also applied through condenser 41 to clamping diode 42 so that the voltage applied to the grid of inverter tube 43 is also as shown in Fig. 9 (d). The phase inverting action of tube 43 and the unidirectional conductivity of clamping diode 44 results in a series of pulses positive relative to ground as shown in Fig. 9 (e). These pulses are applied to the grid of tube 33 by conductor 45 and it will be noted that they are staggered in time relative to the pulses (d) applied to the grid of tube 32. Therefore, when the grid of tube 32 is positive relative to ground the grid of tube 33 is substantially at ground potential and vice versa. A suitable frequency for oscillator 35 is 10 kc.

The circuits 19' and 20' are connected to modulator 46, the circuit details of which are shown in Fig. 6. Circuits 19' and 20' are connected through level adjusting potentiometers 46 and 47 to the grids of tubes 48 and 49, respectively. The output circuits of these tubes are connected in parallel to the input circuit of driven tube 50. Alternate energization of circuits 19' and 20' by switching amplifier 26 causes a substantially continuous application of energy to the input of tube 50, the energy at any particular time coming from either circuit 19' or circuit 20'. Tube 50 drives parallel connected modulator tubes 51 and 52, the output signal of which is developed across the inductive reactance 53. The lower end of inductance 53 is connected to a source of direct current energy which is the source of power for the modulator and also for the power amplifier of the transmitter 69 as will be seen later. The signal voltage developed across inductance 53 is applied in series with the above mentioned source of direct current to the transmitter 69 over conductor 54.

The circuit details of the transmitter 69 are shown in Fig. 7. The oscillator 55 and driver 56 may be of any known type capable of supplying high frequency energy of sufficient power to drive the power amplifier tubes 57 and 58. The frequency of this energy should be sufficiently high to permit modulation by the subcarrier frequencies. For the subcarrier frequencies previously specified a carrier frequency of about 140 megacycles is satisfactory. The modulating signal, obtained from modulator 46, and direct voltage from the direct current power source indicated in Fig. 6, are applied over conductor 54 to the midpoint of the output resonant circuit of the power amplifiers 57 and 58. The modulating signal, which is made up of the aforementioned frequency modulated subcarriers, varies the plate voltage of the power amplifiers and thus amplitude modulates the carrier frequency passing therethrough.

Referring again to Fig. 5, the sine wave output of oscillator 35 is also applied to the synchronizing pulse generator 59 and to the grid of tube 60 therein. Both tube 60 and tube 61 are overdriven clipping devices, similar to tubes 36 and 37 of switching pulse generator 27, and similarly convert the applied sine wave into a square wave which may also be represented by graph (c) in Fig. 9. This square wave is applied to a differentiating circuit comprising condenser 62 and resistor 63 so that the signal voltage appearing on the grid of tube 64 is as shown in Fig. 9 (f). Tube 64 is operated with a high negative bias, obtained from potentiometer 65, so that only the upper parts of the positive peaks of wave (f) are passed. Due to the phase inversion of the tube the output thereof is a series of sharp negative synchronizing pulses, as shown in Fig. 9 (g), which are coupled by means of transformer 66 and conductor 67 to the midpoint of the input resonant circuit of power amplifier tubes 57 and 58 (Fig. 7). The unidirectional device 68 which may be a diode or a semiconductor, serves to restore the direct current component of the pulse train lost in passage through the transformer and to fix the potential of the pulses relative to ground.

The synchronizing pulses applied to the midpoint of the power amplifier input circuit amplitude modulate the carrier wave passing through this amplifier. The final output signal of the transmitter therefore is as shown in Fig. 9 (h). The signal consists of a high-frequency carrier amplitude modulated at 100 microsecond intervals with sharp negative synchronizing pulses of about 3 microseconds duration. The 100 microsecond time interval between synchronizing pulses is divided into two substantially equal periods $x$ and $y$. During the $x$ period one of the positive switching pulses of the wave shown in Fig. 9 (d) renders switching amplifier 30 operative and the carrier is amplitude modulated by the frequency modulated subcarriers obtained from circuit 19 and data oscillators 1' through 9' (Fig. 1). During the $y$ period one of the positive switching pulses of the square wave shown in Fig. 9 (e) renders switching amplifier 31 operative and the carrier is amplitude modulated by the frequency modulated subcarriers obtained from circuit 20 and data oscillators 10' through 18'. As explained in connection with Fig. 1 the subcarrier frequencies in the two groups are the same, namely, $f_1$ through $f_9$. The output signal of the transmitter is applied over transmission line 70 to the antenna 71.

A block diagram of the receiving end of the telemetering system is shown in Fig. 2. The signal received by antenna 72 is of course the same as radiated by antenna 71 and represented in Fig. 9 (h). As already stated, the signal consists of a carrier $f_c$ amplitude modulated at 100 microsecond intervals by synchronizing pulses and also amplitude modulated by frequency modulated subcarriers during the intervals between synchronizing pulses. The interval between pulses is divided into two substantially equal periods $x$ and $y$, with the carrier being modulated during the $x$ period by the frequency modulated subcarriers $(f_1 \pm \Delta f_1) - (f_9 \pm f_9)$ from circuit 19 (Fig. 1) and during the $y$ period by the frequency modulated subcarriers $$(f_1 \pm \Delta f_1) - (f_9 \pm f_9)$$

from circuit 20'. The receiver 73 receives and demodulates this signal so as to produce the synchronizing pulses and the frequency modulated carries in its output circuit. A receiver of any design that is capable of performing this function may be used. The receiver output signal is represented in Fig. 10 (a).

The output of the receiver is applied over circuits 74 and 75 to the synchronizing pulse separator 76 the details of which are shown in Fig. 8. The pulse separation is accomplished by an $m$-derived low-pass filter 77. This filter should have a cutoff frequency as high as possible, without passing the lowest subcarrier frequency, in order to insure a minimum of change in the wave form of the pulses by passing as many of the harmonics of the pulse repetition frequency as possible. In the specific embodiment described the filter had a cut-off frequency of 80 kc., which permitted transmission of harmonics through the seventh. The various filter elements had the following values:

| | | |
|---|---|---|
| $L_1$ | microhenries | 237 |
| $L_2$ | do | 427 |
| $L_3$ | do | 271 |
| $L_4$ | do | 119 |
| $C_1$ | microfarad | .1096 |
| $C_2$ | do | .326 |
| $C_3$ | do | .352 |
| $C_4$ | do | .0482 |
| $C_5$ | do | .590 |
| $C_6$ | do | .871 |
| $C_7$ | do | .369 |

The first three vacuum tube stages of the pulse separator 76 are amplifier stages, however, the last stage 78 is biased beyond the cut-off point by connecting the cathode to a source of positive potential through resistor 79, so that only signals exceeding a fixed amplitude are passed. This serves to remove any low amplitude noise or other extraneous voltages in the signal applied to this tube but does not obstruct passage of the synchronizing pulses. The output of tube 78 is shown in Fig. 10 (b).

In the switching pulse generator 80, also shown in Fig. 8, the negative synchronizing pulses are first applied to a level adjusting potentiometer 81 and then to the grid of tube 82 which, with tube 83, is connected in a multivibrator circuit. Assuming tube 82 to be conductive and tube 83 cut off, the application of a negative synchronizing pulse to the grid of tube 82 reduces the current in that tube and, because of the regenerative action of the circuit, causes a rapid transition to a condition in which tube 83 is conductive and tube 82 cut off. This condition persists until the discharge current of condenser 84, flowing through resistor 85 and biasing the grid of tube 82 beyond its cut-off point, has reached a sufficiently low value to permit conduction in tube 82. At the instant the grid of tube 82 reaches the cut-off point and space current begins to flow, a second rapid switching action takes place which returns the circuit to its original condition with tube 82 conductive and tube 83 cut off. The circuit remains in this condition until another cycle of operation, like the above, is initiated by the next synchronizing pulse. The voltage wave generated at the anode of tube 83 is as shown in Fig. 10 (c). The time constant of condenser 84 and its discharge circuit is made such that the above described second switching action occurs exactly at the end of period $x$ and the beginning of period $y$ in the receiver output signal (Fig. 10 (a)).

The output wave of the multivibrator, shown in Fig. 10 (c), is applied through condenser 86 to the grid of overdriven limiter tube 87 which inverts the wave and clips the negative and positive half-cycles so that a square wave, as shown in Fig. 10 (d), is applied through condenser 88 to clamping diode 89. This diode restores the D. C. component of the square wave and fixes its potential relative to ground so that the wave appearing on conductor 90 is a positive square wave as shown in Fig. 10 (e).

The wave applied to the grid of tube 87 and shown in Fig. 10 (c) is also applied through condenser 91 to the grid of inverter tube 92 and thence through condenser 93 to the grid of overdriven limiter tube 94, so that a square wave as shown in Fig. 10 (f) is applied through condenser 95 to clamping diode 96. The clamping diode restores the D. C. component of the square wave and fixes its potential relative to ground so that the wave appearing on conductor 97 is a positive square wave as shown in Fig. 10 (g).

Referring again to Fig. 2, the receiver output signal, shown in Fig. 10 (a), is also applied over circuits 74 and 98 to the switching amplifier 100. This switching amplifier is similar in construction and operation to the transmitter switching amplifier shown in Figs. 1 and 5 and operates in response to the switching pulses supplied over circuits 90 and 97 to connect circuit 98 to circuit 19" during the time that circuit 19 is connected to circuit 19' in Fig. 1 and to connect circuit 98 to circuit 20" during the time that circuit 20 is connected to circuit 20' in Fig. 1. In this way the modulated subcarriers in circuit 19 of the transmitter are channelled into circuit 19" at the receiver and the modulated subcarriers in circuit 20 at the transmitter are channelled into circuit 20" at the receiver.

The details of switching amplifier 100 are shown in Fig. 8. The signal on conductor 98 is applied to the grids of amplifier tubes 30' and 31', the output circuits of which are coupled respectively to circuits 19" and 20" (Fig. 2). The space current paths of tubes 32' and 33' are connected between the cathodes of tubes 30' and 31', respectively, and the upper end of bias resistor 34', the other end of which is connected to ground. The switching pulses shown in Figs. 10(e) and (g) are applied over conductors 90 and 97, respectively, to the grids of tubes 32' and 33', respectively. These pulses render amplifier tubes 30' and 31 alternately operative and inoperative by the same process as explained in connection with the similar switching amplifier 26 of Fig. 5.

The operation of the two switching amplifiers is synchronized by the synchronizing pulses sent out by the transmitter. For example, during the period $t_0$—$t_1$ the positive pulses 101 (Fig. 9d) and 102 (Fig. 10e) are applied to the grids of tubes 32 (Fig. 5) and 32' (Fig. 8), respectively, so that amplifier tube 30 is operative to couple circuit 19 (Figs. 1 and 5) to circuit 19' and amplifier tube 30' is operative to couple circuit 98 (Fig. 8) to circuit 19". During this period tubes 31 (Fig. 5) and 31' (Fig. 8) are inoperative due to the fact that tubes 33 and 33' are cut off by the bias voltage developed across resistors 34 and 34', respectively, as a result of the space currents of tubes 30 and 30' which flow therethrough. During this period the grids of tubes 33 and 33' are substantially at ground potential as a result of the small voltage drop across diodes 44 and 96. This is due to the fact that the square waves applied to these diodes, which may be represented by wave (f) in Fig. 10, are negative during this period and consequently reduce the cathode potential below that of the potential of the anode so that the diode impedance becomes very low. Similarly, during the period $t_1$—$t_2$ the positive pulses 103 (Fig. 9(c)) and 104 (Fig. 10(g)) are applied to the grids of tubes 33 and 33', respectively, so that amplifier tubes 31 and 31' are operative to couple circuit 20 to circuit 20' and circuit 98 to circuit 20". For the same reasons as given above tubes 30 and 30' are inoperative during this period. The square waves applied to clamping diodes 39 and 89 are shown in Fig. 9 (c) and Fig. 10 (d) and render these diodes conductive and of low impedance during this period.

Referring again to Fig. 2, the circuit 19" feeds in parallel nine filters 110 through 118, only two of which are shown. Filters 110 through 118 are band-pass filters designed to pass the frequency bands generated by data oscillators 1' through 9' respectively (Fig. 1). Similarly, band-pass filters 119 through 127, only two of which are shown, are connected in parallel to circuit 20" and are designed to pass the frequency bands generated by data oscillators 10' through 18', respectively, which bands, as has already been pointed out, are the same as produced by oscillators 1' through 9'. The band-pass filters may be of any suitable design having sufficiently sharp cut-off to separate the various subcarrier frequencies and associated frequency modulation sidebands. In the particular system shown the filters should be capable of passing a band of frequencies 4 kc. wide.

The output of each band-pass filter is applied to an associated discriminator for obtaining the original data signal from the frequency modulated subcarrier as shown in Fig. 2. The discriminators may be of any suitable design having zero or else extremely low sensitivity to amplitude changes in the applied signal. The output signals of the discriminators which correspond to the original data signals, may be applied to any suitable recorder or indicating device.

It is of course understood that the invention is not limited to the transmission of two groups of signals as in the above described specific embodiment. For a greater number of data signals the total may be divided into three or more groups transmitted in succession. Also it is not essential that exactly the same subcarrier frequencies be used in each group, but only that the subcarrier frequencies be distributed over the same frequency band in each group.

We claim:

1. A telemetering system comprising a transmitting station, a receiving station and a single channel transmission means between said stations; said transmitting station comprising a plurality of groups of subcarrier wave generating means, the frequencies of the generated subcarrier waves being distinct in each group but extending over the same frequency band in all groups; means associated with each of said subcarrier wave generating means for modulating the generated subcarrier wave with a data signal; carrier wave generating means; a modulator associated with said carrier wave generating means for modulating said carrier wave in accordance with the signals applied to said modulator; cyclic switching means interposed between said groups of subcarrier wave generating means and said modulator for applying said groups of modulated subcarrier waves to said modulator in succession for substantially equal intervals of time during each cycle of operation of said cyclic switching means; said cyclic switching means comprising a plurality of normally inoperative gated amplifiers equal in number to the number of groups of subcarrier waves, with the subcarrier wave generating means in each group connected to the input of a corresponding one of said gated amplifiers and with the output circuits of said amplifiers connected in parallel to said modulator; a continuously cycling switching pulse generating means for generating in each cycle a plurality of successive rectangular switching pulses equal in number to the number of gated amplifiers and of substantially equal duration; means for applying each of said switching pulses to a corresponding gated amplifier for rendering the amplifier operative for the duration of the pulse; means for generating a synchronizing pulse coincident with the leading edge of the first switching pulse produced in each cycle of operation of said switching pulse generating means; means for applying said synchronizing pulses to said modulator for modulating said carrier wave; and means for impressing said modulated carrier wave on said single channel transmission means; said receiving station comprising means for receiving said modulated carrier wave from said single channel transmission means and for demodulating said carrier wave to produce the original modulation consisting of synchronizing pulses and successively occurring groups of modulated subcarrier waves; means for separating said synchronizing pulses from said modulated subcarrier waves; switching means comprising a plurality of normally inoperative gated amplifiers equal in number to the number of groups of subcarrier waves; means for applying said groups of modulated subcarrier waves to the input circuits of said gated amplifiers in parallel; a plurality of branch circuits equal in number to the number of groups of modulated subcarrier waves; means connecting each branch circuit to the output circuit of a corresponding gated amplifier; actuating means for said switching means comprising means for cyclically generating a plurality of successive rectangular switching pulses equal in number to the number of gated amplifiers and of substantially equal duration; means for applying said synchronizing pulses to sad actuating means for initiating cycles of operation of said actuating means and for synchronizing the operation of said switching means with that of the cyclic switching means in said transmitter in order to channel each of said groups of subcarrier waves into its corresponding branch circuit; and means in each of said branch circuits for separating and demodulating the modulated subcarrier waves therein to reproduce the original data signals.

2. Apparatus as claimed in claim 1 in which the means in each of said branch circuits for separating said modulated subcarrier waves are filters each designed to pass a band of frequencies corresponding to a different one of the subcarrier waves and its associated side bands occurring in the branch circuit.

WILLIAM HAMPTON.
GEORGE W. NEUHARD.

REFERENCES CITED

The following references are of record in the file of this patent:

UNITED STATES PATENTS

| Number | Name | Date |
|---|---|---|
| 2,326,515 | Bartelink | Aug. 10, 1943 |
| 2,373,395 | Dickson et al. | June 9, 1945 |
| 2,466,803 | Giffen et al. | Apr. 12, 1949 |